United States Patent
Nishiura et al.

(10) Patent No.: US 10,633,502 B2
(45) Date of Patent: Apr. 28, 2020

(54) FLAME-RETARDANT FOAMABLE STYRENE RESIN COMPOSITION

(71) Applicant: DAI-ICHI KOGYO SEIYAKU CO., LTD., Kyoto (JP)

(72) Inventors: Masahito Nishiura, Kyoto (JP); Hisanori Semori, Kyoto (JP); Naomi Toyoshima, Kyoto (JP)

(73) Assignee: DAI-ICHI KOGYO SEIYAKU CO., LTD., Kyoto (JP)

(*) Notice: Subject to any disclaimer, the term of this patent is extended or adjusted under 35 U.S.C. 154(b) by 296 days.

(21) Appl. No.: 14/888,885

(22) PCT Filed: Apr. 25, 2014

(86) PCT No.: PCT/JP2014/061703
§ 371 (c)(1),
(2) Date: Nov. 3, 2015

(87) PCT Pub. No.: WO2014/188848
PCT Pub. Date: Nov. 27, 2014

(65) Prior Publication Data
US 2016/0075843 A1  Mar. 17, 2016

(30) Foreign Application Priority Data
May 20, 2013 (JP) .................................. 2013-106034

(51) Int. Cl.
| | | |
|---|---|---|
| C08J 9/00 | (2006.01) | |
| C08J 9/14 | (2006.01) | |
| C08K 5/06 | (2006.01) | |
| C08K 3/22 | (2006.01) | |
| C08K 5/02 | (2006.01) | |

(52) U.S. Cl.
CPC ........... *C08J 9/0023* (2013.01); *C08J 9/0019* (2013.01); *C08J 9/0066* (2013.01); *C08J 9/0095* (2013.01); *C08J 9/141* (2013.01); *C08J 9/142* (2013.01); *C08J 2201/03* (2013.01); *C08J 2203/12* (2013.01); *C08J 2203/14* (2013.01); *C08J 2325/06* (2013.01); *C08K 5/02* (2013.01); *C08K 5/06* (2013.01); *C08K 2003/2296* (2013.01)

(58) Field of Classification Search
CPC ...... C08J 9/0019; C08J 9/0095; C08J 9/0023; C08J 9/0066; C08K 2003/2296
See application file for complete search history.

(56) References Cited

U.S. PATENT DOCUMENTS

| | | | |
|---|---|---|---|
| 3,978,011 A * | 8/1976 | Molbert | C08J 9/0095 521/121 |
| 9,422,410 B2 * | 8/2016 | Nishiura | C08J 9/141 |
| 2008/0096989 A1 | 4/2008 | Maxwell et al. | |
| 2009/0117358 A1 * | 5/2009 | Kruper, Jr. | C08J 9/0019 428/219 |
| 2012/0077894 A1 | 3/2012 | Kruper, Jr. et al. | |
| 2016/0075843 A1 | 3/2016 | Nishiura et al. | |

FOREIGN PATENT DOCUMENTS

| | | |
|---|---|---|
| JP | 2003-327736 | 11/2003 |
| JP | 2005-139356 | 6/2005 |
| JP | 2006-131719 | 5/2006 |
| JP | 2008-525572 | 7/2008 |
| JP | 2011-503256 | 1/2011 |
| WO | 2012/161070 | 11/2012 |
| WO | 2014/188848 | 11/2014 |

OTHER PUBLICATIONS

Machine translation of JP 2006-131719 (Year: 2006).*
Translation of JP 10-231376 (Year: 1998).*
Translation of JP 2003292664 (Year: 2003).*
Scifinder abstract of JP 2003292664 (Year: 2019).*
Scifinder brominated isocyanurate CAS registry No. 52434-90-9 (Year: 2019).*
Machine translation of JP 2006070205 by Goto et al. (Year: 2006).*
Derwent abstract of JP 2006070205 by Goto et al. (Year: 2006).*
Office Action dated Oct. 10, 2017 in corresponding Japanese patent Application No. 2015-518172, with English translation.
International Search Report dated Aug. 5, 2014 in corresponding International Application No. PCT/JP2014/061703 (with English translation).
Decision of Refusal dated Mar. 6, 2018 in Japanese Application No. 2015-518172, with English translation.
Office Action dated Mar. 20, 2019 in corresponding Japanese patent application No. 2018-112001, with English translation.

* cited by examiner

*Primary Examiner* — Michael M Dollinger
(74) *Attorney, Agent, or Firm* — Wenderoth, Lind & Ponack, L.L.P.

(57) ABSTRACT

Provided is a flame-retardant foamable styrene resin composition having a high flame retardancy and thermal stability, and recyclable, with a small amount of a bromine-containing flame retardant added.

A flame-retardant foamable styrene resin composition, containing (A) a styrene resin, (B) a bromine-containing organic compound, (C) zinc oxide, and (D) a foaming agent, in which an amount of (C) the zinc oxide added is less than 2 parts by weight per 100 parts by weight of (A) the styrene resin.

7 Claims, No Drawings

FLAME-RETARDANT FOAMABLE STYRENE RESIN COMPOSITION

TECHNICAL FIELD

The present invention relates to a flame-retardant foamable styrene resin composition having good thermal stability, and its foam.

BACKGROUND ART

Styrene resin foam is lightweight, and is therefore used in various fields such as heat insulation applications such as home appliances and building materials, and civil engineering works applications such as embankment methods.

Styrene resin is composed of only carbon and hydrogen, and has a property of vigorously burning while emitting black smoke once igniting. Therefore, it is required to be flame-retarded by adding a flame retardant depending on its application. Bromine-containing compounds are widely used as such a flame retardant, and in order to impart high flame retardancy in a small addition amount, a flame retardant in which all of bromine atoms are bonded to aliphatic carbon, such as hexabromocyclododecane (HBCD), is effective. However, those flame retardants have low thermal stability, and induce the problems such as deterioration of a resin, coloration of a resin and corrosion of an apparatus due to generation of a hydrogen bromide gas. Furthermore, HBCD is hardly decomposable and has high bioaccumulation property. Therefore, reduction of the amount of HBCD used and development of an alternative flame retardant are required.

Tetrabromobisphenol A-bis(2,3-dibromo-2-methylpropyl ether) is proposed as a compound capable of giving the same level of flame retardancy in the same addition amount as HBCD (Patent Document 1). However, in recent years, it is required, due to increase in public eco-awareness, to again use a styrene resin foam once used or generated as an edge material by cutting when forming a product, as a raw material. In the use of such a recycled styrene resin foam, since a styrene resin foam already passed through a heating and melting step in the last production is used through further heating and melting, a thermal stability more than ever is required. It could not be said that the tetrabromobisphenol A-bis(2,3-dibromo-2-methylpropyl ether) has a sufficient thermal stability.

Tetrabromobisphenol-bis(2,3-dibromopropyl ether), tris(2,3-dibromopropyl)isocyanurate and the like are known as compounds having excellent thermal stability. However, flame-retardant effect is low as compared with a flame retardant such as HBCD, and it is required to greatly increase the addition amount. For this reason, there is a problem that not only physical properties of a styrene resin foam are deteriorated, but a cost of a styrene resin foam is greatly increased.

PRIOR ART DOCUMENTS

Patent Documents

Patent Document 1: JP-A-2005-139356

DISCLOSURE OF THE INVENTION

Problems that the Invention is to Solve

As described above, an alicyclic bromine-containing organic compound such as hexabromocyclododecane and a bromine-containing organic compound having bromine (hereinafter referred to as "tertiary bromine") bonded to a tertiary carbon atom, such as tetrabromobisphenol A-bis(2,3-dibromo-2-methylpropyl ether), having relatively high flame-retardant effect, have the problems that thermal stability is low and when added to a styrene resin foam, its recycling is disturbed. Accordingly, a problem that the present invention is to solve is to provide a flame-retardant foamable styrene resin composition capable of giving high flame retardancy and having excellent thermal stability, and its foam.

Means for Solving the Problem

The present invention is based on an unexpected finding that when a bromide-containing organic compound that has a low flame-retardant effect as compared with an alicyclic bromine-containing organic compound and a bromine-containing organic compound having tertiary bromine but has a high thermal stability is combined with zinc oxide and used for flame retardation of a styrene resin foam, the flame-retardant effect can be improved to at least an equivalent level as that of the alicyclic bromine-containing organic compound and the bromine-containing organic compound having tertiary bromine without adversely affecting the excellent thermal stability. Accordingly, the present invention provides a flame-retardant foamable styrene resin composition containing (A) a styrene resin, (B) a bromine-containing organic compound, (C) zinc oxide, and (D) a foaming agent, in which an amount of (C) the zinc oxide added is less than 2 parts by weight per 100 parts by weight of (A) the styrene resin.

Advantageous Effects of the Invention

According to the present invention, a flame-retardant foamable styrene resin composition capable of giving excellent flame retardancy and having excellent thermal stability, and its foam can be obtained by using (C) the zinc oxide together with (B) the bromine-containing organic compound.

MODE FOR CARRYING OUT THE INVENTION (A) The styrene resin of the present invention is, for example, a homopolymer of styrene, a copolymer of styrene with o-methylstyrene, m-methylstyrene, p-methylstyrene, 2,4-dimethylstyrene, ethylstyrene, p-t-butylstyrene, α-methylstyrene, α-methyl-p-methylstyrene, 1,1-diphenylethylene, p-(N,N-diethylaminoethyl)styrene, p-(N,N-diethylaminomethyl)styrene, or the like, or their mixture. It preferably contains a styrene monomer in an amount of 50 wt % or more, and is typically a polystyrene.

The styrene resin may further contain a rubbery polymer. Examples of the rubbery polymer include polybutadiene, polyisoprene, styrene-butadiene copolymer, styrene-isoprene copolymer, acrylonitrile-butadiene copolymer, styrene-isoprene-butadiene copolymer, butadiene-(meth)acrylic acid ester copolymer, styrene-butadiene block copolymer, styrene-isoprene block copolymer, butyl rubber, ethylene-α-olefin copolymer (ethylene-propylene rubber), ethylene-α-olefin-polyene copolymer (ethylene-propylene-diene rubber), silicone rubber, acrylic rubber, and hydrogenated diene rubber (hydrogenated styrene-butadiene block copolymer, hydrogenated butadiene polymer or the like). Those rubbery polymers can be used alone or as mixtures of two or more kinds thereof. The amount used is preferably 30 wt % or less, and more preferably 20 wt % or less, in the monomer component.

Examples of (B) the bromine-containing organic compound of the present invention include a non-alicyclic bromine-containing organic compound having a 2,3-dibromo-2-alkylpropyl group, a non-alicyclic bromine-containing organic compound having a bromine content of 50 wt % or more and not having tertiary bromine in the molecule, and a non-alicyclic bromine-containing organic compound having a bromine content of 50 wt % or more and having a 2,3-dibromopropyl group in the molecule. Those may be used alone or two or more kinds thereof may be used together.

Examples of the non-alicyclic bromine-containing organic compound having a 2,3-dibromo-2-alkylpropyl group include 2,3-dibromo-2-alkylpropyl ether of a bisphenol compound, such as bisphenol A-bis(2,3-dibromo-2-methylpropyl ether), bisphenol S-bis(2,3-dibromo-2-methylpropyl ether) and bisphenol F-bis(2,3-dibromo-2-methylpropyl ether); 2,3-dibromo-2-alkylpropyl ether of a polybromobisphenol compound, such as polybromobisphenol A-bis(2,3-dibromo-2-methylpropyl ether), polybromobisphenol S-bis(2,3-dibromo-2-methylpropyl ether) and polybromobisphenol F-bis(2,3-dibromo-2-methylpropyl ether); 2,3-dibromo-2-alkylpropyl group-containing isocyanurate such as tris(2,3-dibromo-2-methylpropyl)isocyanurate, and 2,3-dibromo-2-alkylpropyl group-containing cyanurate such as tris(2,3-dibromo-2-methylpropyl)cyanurate. Those may be used alone or two or more kinds thereof may be used together.

As the non-alicyclic bromine-containing organic compound having a bromine content of 50 wt % or more and not having tertiary bromine in the molecule, compounds widely known as a bromine flame retardant can be used. Examples thereof include an aliphatic bromine-containing compound such as tetrabromobisphenol A-bis(2-bromoethyl ether), tetrabromobisphenol S-bis(2-bromoethyl ether), tetrabromobisphenol F-bis(2-bromoethyl ether), bistribromoneopentyl maleate, bistribromoneopentyl fumarate, bistribromoneopentyl adipate, bistribromoneopentyl phthalate, bistribromoneopentyl terephthalate, and tristribromoneopentyl pyromellitate; and an aromatic bromine compound not containing aliphatic bromine such as hexabromobenzene, pentabromotoluene, 1,2-bistribromophenoxyethane, 1,2-bispentabromophenoxyethane, tetrabromobisphenol A, polybromodiphenyl ether, polybromodiphenyl ethane, trispolybromophenoxytriazine, polybromophenyl indane, tetrabromobisphenol A-epoxy oligomer, tetrabromobisphenol A-epoxy oligomer-terminated tribromophenol adduct, tetrabromobisphenol A-carbonate oligomer, polybrominated-polystyrene, poly-polybromostyrene, polybrominated-polyphenylene oxide, polypentabromobenzyl acrylate, and ethylenebistetrabromophthal imide.

Examples of the non-alicyclic bromine-containing organic compound having a bromine content of 50 wt % or more and having a 2,3-dibromopropyl group in the molecule include tetrabromobisphenol A-bis(2,3-dibromopropyl ether), tetrabromobisphenol S-bis(2,3-dibromopropyl ether), tetrabromobisphenol F-bis(2,3-dibromopropyl ether), tris(2,3-dibromopropyl)isocyanurate, tris(2,3-dibromopropyl)cyanurate, bis-2,3-dibromopropyl phthalate, bis-2,3-dibromopropyl terephthalate, and tris-2,3-dibromopropyl pyromellitate.

Those may be used alone or two or more kinds thereof may be used together. Of those, from the standpoints of flame retardancy and thermal stability, it is preferred to contain the non-alicyclic bromine-containing organic compound having a bromine content of 50 wt % or more and not having tertiary bromine in the molecule, it is more preferred to contain the non-alicyclic bromine-containing organic compound having a 2,3-dibromopropyl group, and it is preferred to contain tetrabromobisphenol A-bis(2,3-dibromopropyl ether).

In the case where the non-alicyclic bromine-containing organic compound having a bromine content of 50 wt % or more and not having tertiary bromine in the molecule and another bromine-containing organic compound is used together as (B) the bromine-containing organic compound, (B) the bromine-containing organic compound preferably contains 60% or more of the non-alicyclic bromine-containing organic compound having a bromine content of 50 wt % or more and not having bromine bonded to a tertiary carbon atom, more preferably contains 70% or more, and most preferably contains 80% or more, on the weight-ratio basis. Where the amount is less than 60%, heat resistance of a styrene resin foam is deteriorated, and a styrene resin-extruded foam colors.

The content of (B) the bromine-containing organic compound is preferably from 1 to 10 parts by weight, and more preferably from 1 to 6 parts by weight, per 100 parts by weight of the styrene resin. Within the range, each of flame retardancy, physical properties of a styrene resin foam and cost of a styrene resin foam becomes good.

The greatest characteristic of the present invention is that in making the styrene resin-extruded foam to exhibit flame retardancy by (B) the bromine-containing organic compound, (C) the zinc oxide is added in an amount of less than 2 parts by weight, and preferably less than 1.5 parts by weight, per 100 parts by weight of the styrene resin. It has been found that by the addition, flame retardancy is enhanced while maintaining thermal stability of the resin composition containing (B) the bromine-containing organic compound. It is hitherto known that zinc oxide is used as a thermal conductivity regulator having infrared ray reflectivity, but it is not known that flame retardancy of a foamable styrene resin composition containing (B) the bromine-containing organic compound is improved. When it is 2 parts by weight or more, remarkable improvement effect of flame retardancy is lost.

The flame-retardant foamable styrene resin composition of the present invention can be formed into a foamed molding by an extrusion foaming method. In the case of the extrusion foaming method, (B) the bromine-containing organic compound and other additives are melted and mixed with (A) the styrene resin in an extruder, (D) the foaming agent is injected thereto, followed by an extrusion into the atmosphere from a mouthpiece of the extruder, thereby performing foam molding.

Examples of (D) the foaming agent include a volatile organic foaming agent such as propane, butane, isobutane, pentane, cyclopentane, hexane, cyclohexane, 1-chloro-1,1-difluoroethane, monochlorodifluoromethane, monochloro-1,2,2,2-tetrafluoroethane, 1,1-difluoroethane, 1,1,1,2-tetrafluoroethane, 1,1,3,3,3-pentafluoropropane, dichloromethane, 1,2-dichloroethane, dimethyl ether, diethyl ether, and ethyl methyl ether; an inorganic foaming agent such as water, nitrogen and carbon dioxide gas; and a chemical foaming agent such as an azo compound. Those can be used alone or two or more kinds thereof may be used together. The amount of the foaming agent added varies depending on necessary performance of a foam and a forming method, and is not limited. However, it is preferably from 0.01 to 0.5 parts by weight, and more preferably from 0.05 to 0.3 parts by weight, per 100 parts by weight of the polystyrene resin.

The flame-retardant foamable styrene resin composition of the present invention can further contain (E) a thermal stabilizer. Thermal stability can be further improved by adding the thermal stabilizer. Examples of the thermal stabilizer include a phosphite compound, a thioether compound, a hindered phenol compound, a hindered amine compound, an organic tin compound, a phosphoric acid ester, and hydrotalcite.

Examples of the phosphite compound include tris(2,4-di-t-butylphenyl)phosphite, bis(2,4-di-t-butylphenyl)pentaerythritol diphosphite, bis[2,4-bis(1,1-dimethylethyl)-6-methylphenyl]ethyl ester phosphorous acid, tetrakis(2,4-di-t-butylphenyl)[1,1-biphenyl]-4,4'-diylbisphosphonite, bis(nonylphenyl)pentaerythritol diphosphite, bisstearylpentaerythritol diphosphite, bis(2,6-di-t-butyl-4-methylphenyl)-pentaerythritol diphosphite, 2,2'-methylenebis(4,6-di-t-butyl-1-phenyloxy)(2-ethylhexyloxy)phosphorus, tetra(tridecyl)-4,4'-butylidene-bis(2-t-butyl-5-methylphenyl)diphosphite, hexatridecyl-1,1,3-tris(3-t-butyl-6-methyl-4-oxyphenyl)-3-methylpropane triphosphite, mono(dinonylphenyl)mono-p-nonylphenyl phosphite, tris(mononylphenyl)phosphite, tetraalkyl(C=12 to 16)-4,4'-isopropylidene-(bisphenyl)diphosphite, mono- or diphenyl mono- or dialkyl (or alkoxyalkyl, C=8 to 13) phosphite, diphenylisodecyl phosphite, trisdecyl phosphite, and triphenyl phosphite.

Examples of the thioether compound include dilauryl-3,3'-thiodipropionate, dimyristyl-3,3'-thiodipropionate, distearyl-3,3'-thiodipropionate, pentaerythritolyl tetrakis(3-laurylthiopropionate), ditridecyl-3,3'-thiodipropionate, and 2-mercaptobenzimidazole.

Examples of the hindered phenol compound include 1,6-hexanediol-bis[3-(3,5-di-t-butyl-4-hydroxyphenyl)propionate], triethylene glycol-bis[3-(3-t-butyl-5-methyl-4-hydroxyphenyl)propionate], glycerin tris[3-(3,5-di-t-butyl-4-hydroxyphenyl)-propionate], pentaerythritol tetrakis[3-(3,5-di-t-butyl-4-hydroxyphenyl)propionate], octadecyl-3-(3,5-di-t-butyl-4-hydroxyphenyl)propionate, thiodiethylenebis[3-(3,5-di-t-butyl-4-hydroxyphenyl)propionate], N,N'-hexane-1,6-diylbis[3-(3,5-di-t-butyl-4-hydroxyphenyl) propionamide], 2,4-dimethyl-6-(1-methylpentadecyl) phenol, diethyl[[3,5-bis(1,1-dimethylethyl)-4-hydroxyphenyl]methyl]phosphonate, calcium diethylbis[[3,5-bis(1,1-dimethylethyl)-4-hydroxyphenyl]methyl] phosphonate, 3,3',3'',5,5',5''-hexa-t-butyl-a,a',a''-(mesitylene-2,4,6-tolyl)tri-p-cresol, 4,6-bis(octyl thiomethyl)-o-cresol, ethylenebis(oxyethylene)bis[3-(5-t-butyl-4-hydroxy-m-tolyl)-propionate], hexamethylenebis[3-(3,5-di-t-butyl-4-hydroxyphenyl)propionate], 1,3,5-tris(3,5-di-t-butyl-4-hydroxybenzyl)-1,3,5-triazine-2,4,6(1H,3H,5H)-trione, 1,3,5-tris[(4-t-butyl-3-hydroxy-2,6-xylyl) methyl]-1,3,5-triazine-2,4,6(1H,3H,5H)-trione, and 2,6-di-t-butyl-4-(4,6-bis(octylthio)-1,3,5-triazine-2-ylamino)phenol.

Examples of the hindered amine compound include 4-benzoyloxy-2,2,6,6-tetramethylpiperidine, bis(2,2,6,6-tetramethyl-4-piperidinyl)cebacate, bis(1,2,2,6,6-pentamethyl-4-piperidinyl)cebacate, bis(1,2,2,6,6-pentamethyl-4-piperidinyl)-2-(3,5-di-t-butyl-4-hydroxybenzyl-2-n-butylmalonate, tetrakis(2,2,6,6-tetramethyl-4-piperidinyl-1,2,3,4-butanetetracarboxylate, and tetrakis(1,2,2,6,6-pentamethyl-4-piperidinyl)-1,2,3,4-butanetetracarboxylate.

Examples of the organic tin compound include dioctyltin dilaurate and dioctyltin maleate, and examples of the phosphoric acid ester include triphenyl phosphate, tricresyl phosphate and trixylenyl phosphate.

In the case of using (E) the thermal stabilizer, the amount thereof added is preferably from 0.01 to 0.5 parts by weight per 100 parts by weight of (A) the styrene resin.

In producing the flame-retardant styrene resin foamed molding of the present invention, it can be conducted while (F) a foaming nucleating agent being further added in addition to (D) the foaming agent. Examples of the foaming nucleating agent include talc, bentonite, kaolin, mica, silica, clay, and diatomaceous earth. In the case of using the foaming nucleating agent, the amount thereof used is preferably from 0.01 to 20 parts by weight, and more preferably from 0.1 to 10 parts by weight, per 100 parts by weight of the polystyrene resin.

The flame-retardant foamable styrene resin composition of the present invention can further contain conventional resin additives such as a photostabilizer, an ultraviolet absorber, an ultraviolet stabilizer, a heavy metal deactivator, an impact modifier, a colorant, a lubricant, a drip inhibitor, a crystal nucleating agent, an antistatic agent, and a compatibilizer in a range that the effect of the present invention is not impaired.

EXAMPLES

The present invention is specifically described below by reference to Examples and Comparative Examples, but it should be understood that the present invention is not limited by those.

Raw materials used in the Examples and Comparative Examples are as follows.
(A) Styrene resin
GP-PS; PSJ polystyrene G9305 (manufactured by PS Japan Corporation)
(B) Bromine-containing organic compound:
(B1) Tetrabromobisphenol-bis(2,3-dibromopropyl ether); trade name PYROGUARD SR720N (manufactured by DKS Co. Ltd.)
(B2) Tetrabromobisphenol A-bis(2,3-dibromo-2-methylpropyl ether); trade name PYROGUARD SR-130 (manufactured by DKS Co. Ltd.)
(B3) Tris(2,3-dibromopropyl)isocyanurate; trade name PYROGUARD SR-750 (manufactured by DKS Co. Ltd.)
(B4) Tris(tribromophenoxy)triazine; trade name PYROGUARD SR245 (manufactured by DKS Co. Ltd.)
(B5) Hexabromocyclododecane; trade name PYROGUARD SR-103 (manufactured by DKS Co. Ltd.)
Flame retardant aid, (C) zinc oxide; trade name Zinc Oxide Grade No. 2 (manufactured by Sakai Chemical Industry Co., Ltd.)
(C1) (Phosphoric acid ester) triphenylphosphate; trade name TPP (manufactured by Daihachi Chemical Industry Co., Ltd.)
(C2) $Mg_3ZnAl_2(OH)_{12}CO_3 \cdot mH_2O$; trade name ZHT-4A (manufactured by Kyowa Chemical Industry Co., Ltd.)
(C3) Synthetic zeolite; trade name ZEOLUM A-3 (manufactured by Tosoh Corporation)
(C4) Synthetic hydrotalcite $Mg_{4.3}Al_2(OH)_{12.6}CO_3 \cdot mH_2O$; trade name DHT-4A (manufactured by Kyowa Chemical Industry Co., Ltd.)
(C5) Zinc stearate; 1.5 μm GR (manufactured by Wako Pure Chemical Industries, Ltd.)
(C6) Zinc borate; trade name FIREBRAKE ZB (manufactured by RIO TINTO)
(C7) Zinc tin trioxide; trade name Flamtard S (manufactured by Williamblythe)

(C8) Zinc carbonate; transparent zinc white MH (manufactured by Sakai Chemical Industry Co., Ltd.)
(C9) 2,3-Dimethyl-2,3-diphenylbutane; NOFMER BC-90 (manufactured by NOF Corporation)
(C10) Antimony trioxide; trade name PYROGUARD AN-800 (T) (manufactured by DKS Co. Ltd.)
(D) Foaming agent
(D-1) Isobutane
(D-2) Dimethyl ether
(E) Thermal stabilizer
(E-1) Bis(2,6-di-t-butyl-4-methylphenyl)pentaerythritol diphosphate; trade name ADK STAB PEP-36 (manufactured by ADEKA Corporation)
(F1) Foaming nucleating agent
Talc MS (manufactured by Nippon Talc Co., Ltd.)
<Test Piece Preparation Method>
(Extrusion-Foamed Molding)

Raw materials shown in Table 1 and Table 2 excluding a foaming agent were charged in an extruder having a bore diameter of 65 mm of a two-stage extruder in which the 65 mm-bore is directly connected to a 90 mm-bore, and heated to 200° C. to melt them, followed by plasticizing and kneading, thereby obtaining a styrene resin composition. Subsequently, a predetermined amount of a foaming agent was injected into a tip (an opposite side of a mouthpiece of the 90 mm bore diameter extruder) of the 65 mm extruder through a separate line, and a resin temperature was cooled to 120° C. in the 90 mm bore diameter extruder, followed by extruding into the atmosphere from a die lip having a rectangular cross-section having 2.5 mm in a thickness direction and 45 mm in a width direction provided at the tip of the 90 mm bore diameter extruder. Thus, a rectangular solid-shaped extrusion-foamed molding of the styrene resin was obtained.

The foamed molding was evaluated by the following methods.

<Flame Retardancy>
Oxygen index was measured according to JIS K-7201.
○: Oxygen index is 26 or more
x: Oxygen index is less than 26

<Molecular Weight Reduction Rate>
Molecular weight of a styrene resin before foaming molding and a flame-retardant styrene resin foamed molding was measured with GPC analysis, and a reduction rate (%) of a weight average molecular weight (Mw) before and after molding of the polystyrene resin was calculated.

<Heat Resistance>
An extrusion-foamed molding during test was sliced with a cutter to obtain a board, and it was compressed with biaxial rolls and then cracked with a grinder. The cracked material was charged in a Labo Plastomill, melted and kneaded at 200° C., immediately taken out, and then molded into a plate shape having a thickness of 3.2 mm with a cooling press. The plate-shaped molding obtained was heated with a 220° C. hot press for 40 minutes, and then cooled with a cooling press to obtain a heat-resistant test sample. ΔE of the heat-resistant test sample was obtained by using a spectrophotometer SD 6000 manufactured by Nippon Denshoku Industries Co., Ltd based on a standard white plate. A small ΔE indicates a high heat resistance.

Formulations of resin compositions and test results in Examples and Comparative Examples are shown in Table 1 and Table 2. In the tables, numerical values of components are parts by weight.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Formulation | Styrene resin | A | 100 | 100 | 100 | 100 | 100 | 100 | 100 | 100 | 100 | 100 | 100 |
| | Flame retardant | B1 | 3 | 3 | 3 | 3 | 3 | 5 | 8 | 2.85 | 2.7 | 2.1 | 3 |
| | | B2 | | | | | | | | 0.15 | | | |
| | | B3 | | | | | | | | | 0.3 | | |
| | | B4 | | | | | | | | | | 0.9 | |
| | Flame retardant aid | C | 0.05 | 0.01 | 0.1 | 0.5 | 1 | 0.05 | 0.05 | 0.05 | 0.05 | 0.05 | 0.05 |
| | | C1 | | | | | | | | | | 1 | |
| | | C2 | | | | | | | | | | | |
| | | C3 | | | | | | | | | | | |
| | | C4 | | | | | | | | | | | |
| | | C5 | | | | | | | | | | | |
| | | C6 | | | | | | | | | | | |
| | | C7 | | | | | | | | | | | |
| | | C8 | | | | | | | | | | | |
| | | C9 | | | | | | | | | | | 0.1 |
| | | C10 | | | | | | | | | | | |
| | Stabilizer | E1 | 0.05 | 0.05 | 0.05 | 0.05 | 0.05 | 0.05 | 0.05 | 0.05 | 0.05 | 0.05 | 0.05 |
| | Foaming agent | D1 | 3 | 3 | 3 | 3 | 3 | 3 | 3 | 3 | 3 | 3 | 3 |
| | | D2 | 3 | 3 | 3 | 3 | 3 | 3 | 3 | 3 | 3 | 3 | 3 |
| | Foaming nucleating agent | F1 | 1 | 1 | 1 | 1 | 1 | 1 | 1 | 1 | 1 | 1 | 1 |
| Evaluation | Flame retardancy | | ○ | ○ | ○ | ○ | ○ | ○ | ○ | ○ | ○ | ○ | ○ |
| | Molecular weight reduction rate (%) | | 3 | 3 | 3 | 3 | 3 | 3 | 3 | 5 | 7 | 4 | 3 |
| | Heat resistance, ΔE | | 16 | 15 | 16 | 16 | 15 | 16 | 16 | 22 | 23 | 18 | 16 |

TABLE 2

|  |  |  | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 | Com. Ex. 10 | Com. Ex. 11 |
| --- | --- | --- | --- | --- | --- | --- | --- | --- | --- | --- | --- | --- | --- |
| Formulation | Styrene resin | A | 100 | 100 | 100 | 100 | 100 | 100 | 100 | 100 | 100 | 100 | 100 |
|  | Flame retardant | B1 | 3 | 3 | 3 | 3 | 3 | 3 | 3 | 3 | 3 | 3 |  |
|  |  | B5 |  |  |  |  |  |  |  |  |  |  | 3 |
|  | Flame retardant aid | C |  |  |  |  |  |  |  |  |  |  |  |
|  |  | C1 |  |  |  |  |  |  |  |  |  |  |  |
|  |  | C2 |  | 0.05 |  | 0.05 |  |  |  |  |  |  |  |
|  |  | C3 |  |  | 0.05 | 0.05 |  |  |  |  |  |  |  |
|  |  | C4 |  |  |  |  | 0.05 |  |  |  |  |  |  |
|  |  | C5 |  |  |  |  |  | 0.05 |  |  |  |  |  |
|  |  | C6 |  |  |  |  |  |  | 0.05 |  |  |  |  |
|  |  | C7 |  |  |  |  |  |  |  | 0.05 |  |  |  |
|  |  | C8 |  |  |  |  |  |  |  |  | 0.05 |  |  |
|  |  | C9 |  |  |  |  |  |  |  |  |  |  |  |
|  |  | C10 |  |  |  |  |  |  |  |  |  | 0.05 |  |
|  | Stabilizer | E1 | 0.05 | 0.05 | 0.05 | 0.05 | 0.05 | 0.05 | 0.05 | 0.05 | 0.05 | 0.05 | 0.05 |
|  | Foaming agent | D1 | 3 | 3 | 3 | 3 | 3 | 3 | 3 | 3 | 3 | 3 | 3 |
|  |  | D2 | 3 | 3 | 3 | 3 | 3 | 3 | 3 | 3 | 3 | 3 | 3 |
|  | Foaming nucleating agent | F1 | 1 | 1 | 1 | 1 | 1 | 1 | 1 | 1 | 1 | 1 | 1 |
| Evaluation |  | Flame retardancy | X | X | X | X | X | X | X | X | X | X | ○ |
|  |  | Molecular weight reduction rate (%) | 2 | 2 | 2 | 2 | 2 | 2 | 2 | 2 | 2 | 2 | 10 |
|  |  | Heat resistance, ΔE | 12 | 15 | 15 | 15 | 15 | 15 | 15 | 15 | 15 | 15 | 30 |

As is apparent from Table 1 and Table 2, the extruded foams of Examples 1 to 11 are satisfactory in all items of flame retardancy, molecular weight reduction rate and heat resistance, but the extruded foams of Comparative Examples 1 to 10 did not achieve satisfactory performance in flame retardancy. The extruded foam of Comparative Example 11 was satisfactory in flame retardancy, but was poor in molecular weight reduction rate and heat resistance and was not suitable for recycling.

The invention claimed is:

1. A flame-retardant foamable polystyrene resin composition, consisting of
(A) polystyrene,
(B) one or more bromine-containing organic compound(s),
(C) zinc oxide, and
(D) one or more foaming agent(s),
(E) a thermal stabilizer,
(F) a foaming nucleating agent, and
optionally, one or more resin additive(s),
wherein an amount of (B) the one or more bromine-containing organic compound(s) added is from 1 parts by weight to 10 parts by weight per 100 parts by weight of (A) the polystyrene,
wherein an amount of (C) the zinc oxide added is less than 2 parts by weight per 100 parts by weight of (A) the polystyrene,
wherein (B) the one or more bromine-containing organic compound(s) contain (B1) tetrabromobisphenol A-bis (2,3-dibromopropyl ether),
wherein the amount of (B1) the tetrabromobisphenol A-bis(2,3-dibromopropyl ether) in (B) is 60 wt % or more, and
wherein the one or more resin additive(s) is/are at least one selected from the group consisting of one or more photostabilizer(s), one or more ultraviolet absorber(s), one or more ultraviolet stabilizer(s), one or more heavy metal deactivator(s), one or more impact modifier(s), one or more colorant(s), one or more lubricant(s), one or more drip inhibitor(s), one or more crystal nucleating agent(s), one or more antistatic agent(s), and one or more compatibilizer(s).

2. A foamed molding obtained by extrusion molding the flame-retardant foamable polystyrene resin composition according to claim 1.

3. The flame-retardant foamable polystyrene resin composition according to claim 1, wherein the one or more resin additive(s) is/are at least one selected from the group consisting of one or more photostabilizer(s), one or more ultraviolet absorber(s), one or more ultraviolet stabilizer(s), one or more heavy metal deactivator(s), one or more colorant(s), one or more lubricant(s), one or more drip inhibitor(s), one or more crystal nucleating agent(s), one or more antistatic agent(s), and one or more compatibilizer(s).

4. The flame-retardant foamable polystyrene resin composition according to claim 1, wherein (E) the thermal stabilizer is selected from the group consisting of one or more phosphite compound(s), one or more thioether compound(s), one or more hindered phenol compound(s), one or more hindered amine compound(s), one or more organic tin compound(s), one or more phosphoric acid ester(s), one or more hydrotalcite(s), and mixtures thereof.

5. The flame-retardant foamable polystyrene resin composition according to claim 1, wherein the flame-retardant foamable polystyrene resin composition achieves a foam having an oxygen index of 26 or more as measured in accordance with JIS K-7201.

6. The flame-retardant foamable polystyrene resin composition according to claim 1, wherein the flame-retardant foamable polystyrene resin composition achieves a foam having a ΔE of 16 or less.

7. The flame-retardant foamable polystyrene resin composition according to claim 1, wherein the flame-retardant foamable polystyrene resin composition achieves a foam having an oxygen index of 26 or more as measured in accordance with JIS K-7201, and wherein the flame-retardant foamable polystyrene resin composition achieves a foam having a ΔE of 16 or less.

* * * * *